United States Patent

Hippley et al.

[11] Patent Number: 6,061,623
[45] Date of Patent: May 9, 2000

[54] METHOD AND SYSTEM FOR PRE-POSITIONING WHEEL TORQUE IN A TORQUE BASED VEHICLE SPEED CONTROL

[75] Inventors: Richard John Hippley, Canton; Marek Jaroslaw Jastrzebski, South Lyon; Kevin Joseph Rzemien, Warren, all of Mich.

[73] Assignee: Ford Global Technologies, Inc., Dearborn, Mich.

[21] Appl. No.: 09/118,102

[22] Filed: Jul. 17, 1998

[51] Int. Cl.[7] ................................................. B60K 31/00
[52] U.S. Cl. ............................. 701/93; 180/170; 123/352
[58] Field of Search ............................. 701/93, 94, 95, 701/110, 70; 180/170, 176, 179; 123/350, 352, 361

[56] References Cited

U.S. PATENT DOCUMENTS

| | | |
|---|---|---|
| 4,829,438 | 5/1989 | Etoh ............................................ 701/94 |
| 4,833,612 | 5/1989 | Okuno et al. . |
| 4,843,553 | 6/1989 | Ohata . |
| 4,884,203 | 11/1989 | Preis et al. . |
| 4,953,093 | 8/1990 | Etoh ............................................ 701/95 |
| 5,088,043 | 2/1992 | Akishino et al. . |
| 5,392,215 | 2/1995 | Morita . |
| 5,420,793 | 5/1995 | Oo et al. . |
| 5,463,993 | 11/1995 | Livshits et al. . |
| 5,508,923 | 4/1996 | Ibamoto et al. ............................ 701/70 |
| 5,577,474 | 11/1996 | Livshiz et al. . |
| 5,581,465 | 12/1996 | Adler et al. . |
| 5,625,558 | 4/1997 | Togai et al. . |
| 5,663,880 | 9/1997 | Saur et al. . |

*Primary Examiner*—Gary Chin
*Attorney, Agent, or Firm*—Allan J. Lippa; Roger L. May

[57] ABSTRACT

A method and system for controlling an internal combustion engine upon initial entry into a speed control mode and upon transitions between dynamic operating modes of a speed control system includes means for determining an actual vehicle acceleration and means for determining an actual wheel torque. A controller determines an initial desired wheel torque based on the actual vehicle acceleration and the actual wheel torque and controls the torque generated by the engine based on the initial desired wheel torque so as to smoothly control the speed of the vehicle.

20 Claims, 4 Drawing Sheets

METHOD AND SYSTEM FOR PRE-POSITIONING WHEEL TORQUE IN A TORQUE BASED VEHICLE SPEED CONTROL

CROSS REFERENCE TO RELATED APPLICATIONS

The present invention is related to co-pending application entitled "System And Method For Torque Based Vehicle Speed Control," filed Aug. 4, 1997, and having Ser. No. 08/905,664, which is assigned to the same assignee as the present invention.

TECHNICAL FIELD

The present invention relates to methods and systems for pre-positioning wheel torque for use in controlling the speed of a vehicle having torque based speed control.

BACKGROUND ART

Vehicle speed control or cruise control systems are well known in the prior art. Typical systems and methods allow a vehicle operator to engage a cruise control device to set and maintain a constant vehicle speed and to subsequently resume a previously set vehicle speed after interruption. Mechanical, electromechanical, and electronic implementations have been developed for a wide variety of engine types. A number of control strategies utilize either PI or PID closed-loop control of the vehicle speed based upon throttle angle position.

An alternative control strategy utilizes desired engine torque as an output rather than throttle angle position. In these types of control strategies, real-time dynamic information, i.e., instantaneous torque at the wheels, is continually obtained and recalculated for use by a controller in commanding output torque at the wheels rather than a position of the throttle. A problem encountered with such a strategy, however, includes roughness and initial dynamic oscillations upon initial entry into the speed control mode as well as transitions between dynamic operating modes.

DISCLOSURE OF THE INVENTION

Thus, it is an object of the present invention to provide a method and system for improving the feel of a vehicle speed control system which utilizes an engine torque based controller.

In carrying out the above object and other objects, features and advantages of the present invention, a method is provided for controlling an internal combustion engine upon initial entry into a speed control mode and upon transitions between dynamic operating modes of the speed control system. The method includes determining an actual vehicle acceleration, determining an actual wheel torque, determining an initial desired wheel torque based on the actual vehicle acceleration and the actual wheel torque, and controlling torque generated by the engine based on the initial desired wheel torque so as to smoothly control the speed of the vehicle.

In further carrying out the above object and other objects, features and advantages of the present invention, a system is also provided for carrying out the steps of the above described method. The system includes means for determining an actual vehicle acceleration and means for determining an actual wheel torque. The system also includes a controller operative to determine an initial desired wheel torque based on the actual vehicle acceleration and the actual wheel torque, and control torque generated by the engine based on the initial desired wheel torque so as to smoothly control the speed of the vehicle.

The above object and other objects, features and advantages of the present invention are readily apparent from the following detailed description of the best mode for carrying out the invention when taken in connection with the accompanying drawings.

DETAILED DESCRIPTION OF THE INVENTION

Figure 1:
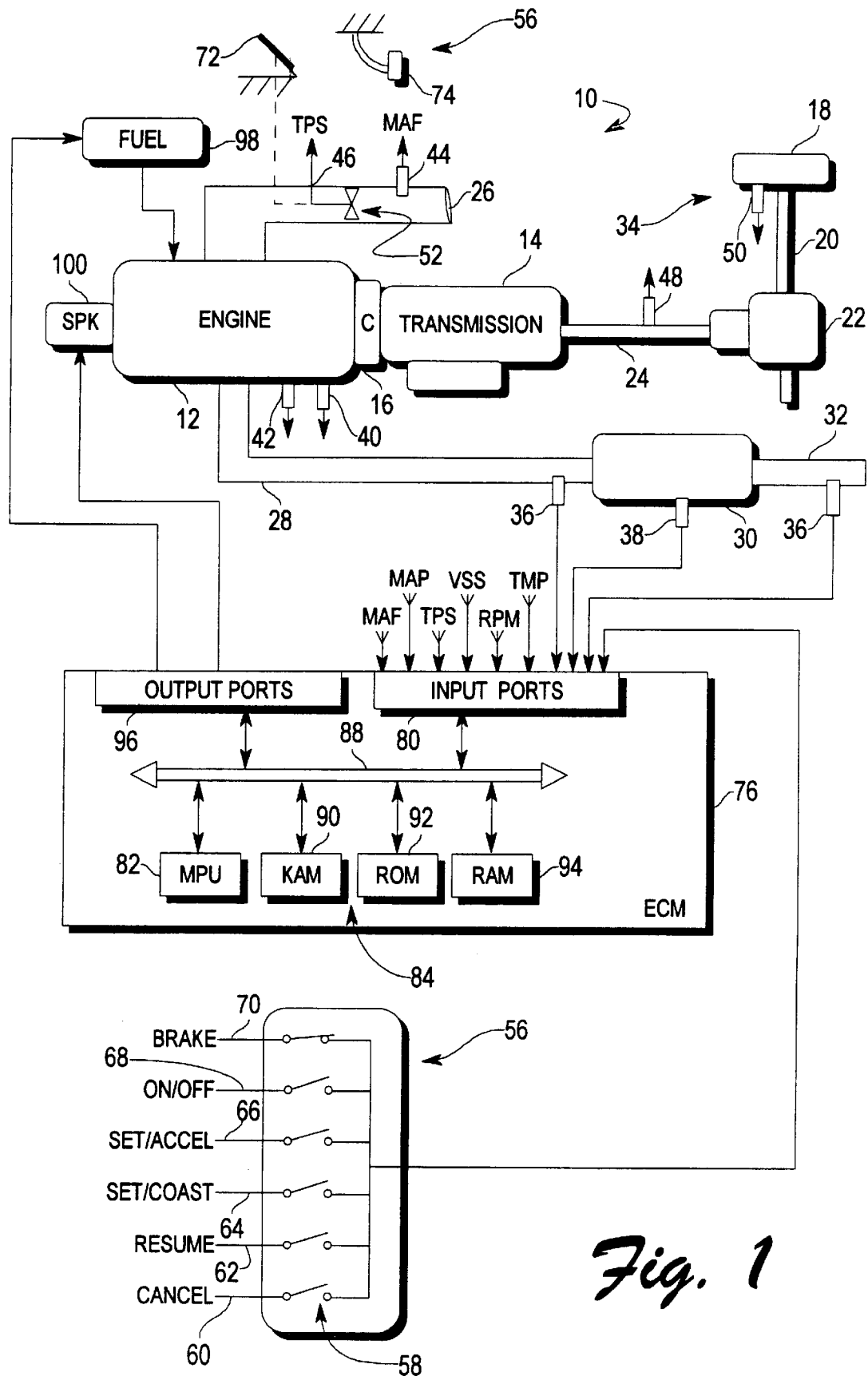
FIG. 1 is a block diagram illustrating a vehicle speed control system and method according to the present invention.

Referring now to FIG. 1, a block diagram illustrating a system and method for vehicle speed control according to the present invention is shown. System 10 includes an engine 12 connected to a transmission 14 via a clutch 16. Vehicle wheels 18 (only one of which is shown) are connected to transmission 14 via axle 20, transaxle 22, and prop shaft 24. While a rear-wheel drive system with a manual transmission is illustrated, the present invention may of course be applied to other vehicle configurations. In a preferred embodiment, engine 12 is a spark ignition (SI) engine which includes an intake 26 and an exhaust 28 connected to a catalytic converter 30 which is connect to an exhaust pipe 32. Various sensors, indicated generally by reference numeral 34, are used to monitor and control operation of engine 12 and/or transmission 14. Of course, the present invention may be applied to various other types of engines, such as compression-ignition or diesel engines. Sensors 34 may include any of a variety of well known sensors such as heated exhaust gas oxygen (HEGO) sensors 36, a catalytic converter temperature sensor 38, engine RPM sensor 40, coolant temperature sensor 42, mass air flow sensor 44, and throttle position sensor 46. Sensors 34 may also include a vehicle speed sensor 48 and one or more wheel speed sensors 50 to provide an indication of vehicle speed.

System 10 also includes various input devices, indicated generally by reference numeral 56, for indicating a desired vehicle speed. Input devices 56 may include switches 58 used to control a cruise control or vehicle speed controller. In a preferred embodiment, switches 58 include a first switch 60 which functions as a cancel switch, a second switch 62 which initiates a resume function, a third switch 64 which initiates a speed set/coast function, a fourth switch 66 which functions as a speed set/accelerate switch, a fifth switch 68 which functions as an on/off switch, and a brake switch 70 which functions similar to the cancel switch 60 to suspend operation of the cruise control function as explained in greater detail below. Input devices 56 also may include an accelerator pedal 72 and brake pedal 74. As illustrated, accelerator pedal 72 is associated with throttle position sensor 46. This may be a mechanical, electromechanical, or purely electrical/electronic connection. For example, in a "drive-by-wire" system, accelerator pedal 72 has an associated sensor which provides an input signal to an engine control module (ECM) 76 which in turn provides an output signal to an air flow actuator or throttling device, such as throttle valve 52 and associated position sensor 46. For systems without electronic throttle control, accelerator pedal 72 may be mechanically linked to throttle valve 52 to control the opening thereof. For mechanically linked systems, the vehicle cruise control may utilize a servo motor or similar device to control throttle valve 52 when the cruise control mode is activated.

As also illustrated in FIG. 1, system 10 preferably includes a controller, such as ECM 76, in communication with sensors 34 and input devices 56 via input ports 80. ECM 76 includes a microprocessor 82 in communication with various computer readable storage media 84 via a data and control bus 88. Computer-readable storage media 84 may include various types of volatile and non-volatile media or memories such as keep-alive memory 90, read-only memory 92, and random access memory 94. The various memories may be implemented utilizing any of a number of known hardware devices such as flash memory, PROMs, EEPROMs, and other electrical, electromagnetic, and optical storage devices capable of storing data representing instructions executable by a computer.

As is known, computer-readable media 84 contain various program instructions, software, or control logic to affect control of engine 12. Media 84 may include various types of data representing calibration values, current values of operating e;parameters, microprocessor instructions, and the like. Microprocessor 82 executes various instructions to generate output signals through output ports 96 based on signals received through input ports 80, generally indicative of current operating conditions. Output signals generated by ECM 76 are communicated to various system actuators such as fuel controller 98 and spark controller 100.

ECM 76 may generate various other output signals to control actuators or indicators depending on the particular application. For example, an output signal may be generated to control an air flow actuator, spark timing, and/or fuel quantity to control the torque generated by engine 12. In a preferred embodiment, ECM 76 communicates with input devices 56 and sensors 34 to determine a speed error based on the current vehicle speed and a desired vehicle speed. ECM 76 then determines an appropriate wheel torque to be delivered by engine 12 to wheels 18 of the vehicle based on the speed error and control the torque generated by engine 12 to reduce the speed error toward zero. Preferably, ECM 76 implements a PIQ (proportional-integral-quadratic) closed loop controller to maintain a desired vehicle speed or acceleration as explained below. PIQ control is explained in greater detail in U.S. Pat. No. 5,420,793 to Oo, et al. hereby incorporated by reference in its entirety. Engine torque may be determined as explained in detail in U.S. Pat. No. 5,241,855 to Cullen, et al. hereby incorporated by reference in its entirety. An appropriate wheel torque is then determined based on the transaxle ratio, and current transmission ratio. As is well known in the art, engine torque may be controlled by controlling air flow through intake 26 of engine 12, controlling fuel quantity through fuel controller 98, and/or controlling spark timing through spark controller 100. Preferably, engine torque is controlled by controlling airflow through intake 26 via a throttling device.

In one embodiment of the present invention, ECM 76 determines a current vehicle acceleration based on a change of the vehicle speed over a predetermined period or event. The vehicle speed may be determined using the vehicle speed sensor 48 and/or one or more wheel speed sensors 50. Alternatively, vehicle acceleration may be determined using an accelerometer or similar device. In this embodiment, ECM 76 determines an appropriate wheel torque to be delivered to wheels 18 based on the current vehicle acceleration and a desired vehicle acceleration. ECM 76 then controls the torque generated by engine 12 to reduce the acceleration error toward zero. Preferably, ECM 76 includes appropriate instructions or control logic implemented in software and hardware to realize both a closed loop PIQ vehicle speed controller and a closed loop PIQ vehicle acceleration controller, the operation of which are mutually exclusive as explained in greater detail below.

The purpose of this invention is to quickly pre-position the system to an open loop "best guess" value whenever a change in operating mode occurs that will cause a change in intended vehicle acceleration. With a torque based control system, this is best accomplished by requesting a new wheel torque value.

At any given time, the torque delivered to the vehicle's drive wheels is used to overcome running resistance (tire rolling resistance and windage loss) and road load (grade). The amount of wheel torque in excess of this will generate a vehicle acceleration in proportion to the vehicle mass, tire and wheel rotational inertia and tire diameter. Assuming running resistance and road load remain constant, this relationship can be used to calculate a delta wheel torque that will produce a desired delta vehicle acceleration without having to know the actual values of running resistance or road load. Granted that running resistance and road load never remain constant, this delta wheel torque can still be used to determine the open loop pre-position value used before translating into a conventional closed-loop PI or PID control. As running resistance and road load changes, speed will be maintained through the action of the closed-loop controller. The result is a vehicle speed control system with improved accuracy, smoothness and response when a mode change is commanded.

Expressed mathematically:

$$TQw = TQrr + TQrl + KA, \qquad (1)$$

where TQw is wheel torque delivered to the drive wheels, TQrr is the torque loss due to running resistance, TQrl is the torque loss due to road load conditions and KA is the torque used to produce vehicle acceleration, which is represented by the product of the vehicle acceleration and a constant representing the combined effects of vehicle mass, wheel and tire rotational inertia and tire diameter.

The torque to produce a new value of acceleration an instant in time later is:

$$TQw' = TQrr + TQrl + KA' \qquad (2)$$

Subtracting Equation (2) from Equation (1) results in:

$$TQw - TQw' = K(A - A') \qquad (3)$$

Solving for TQw':

$$TQw' = TQw - K(A - A') \qquad (4)$$

Since the original values of torque and acceleration represent the actual values being measured currently on the vehicle and the new values represent the desired values after the change in mode, this gives:

$$TQdes = TQact - K(Aact - Ades), \qquad (5)$$

where TQdes is the desired wheel torque, TQact is the actual wheel torque, Aact is the actual vehicle acceleration, and Ades is the desired vehicle acceleration after the change in mode.

Because of errors accrued during the process of converting a wheel torque to an engine torque to an engine control parameter, the wheel torque requested is not always the wheel torque delivered. Errors between desired and actual wheel torque can be monitored over time to produce a correction factor used to calculate a requested wheel torque that will produce the desired wheel torque.

$$TQerr = TQact - TQrqst \quad (6)$$

Since the intent to request a wheel torque that will ultimately produce the desired wheel torque, we can substitute TQdes for TQact giving:

$$TQerr = TQdes - TQrqst \quad (7)$$

Solving for TQrqst:

$$TQrqst = TQdes - TQerr \quad (8)$$

Substituting Equation (5) into Equation (8) results in:

$$TQrqst = TQact - K(Aact - Ades) - TQerr \quad (9)$$

This requesting torque is the torque used to pre-position the system by using it to initialize the PI(D) controller. Substituting initial wheel torque, TQinit, for requested wheel torque gives:

$$TQinit = TQact - K(Aact - Ades) - TQerr \quad (10).$$

Figure 2A:
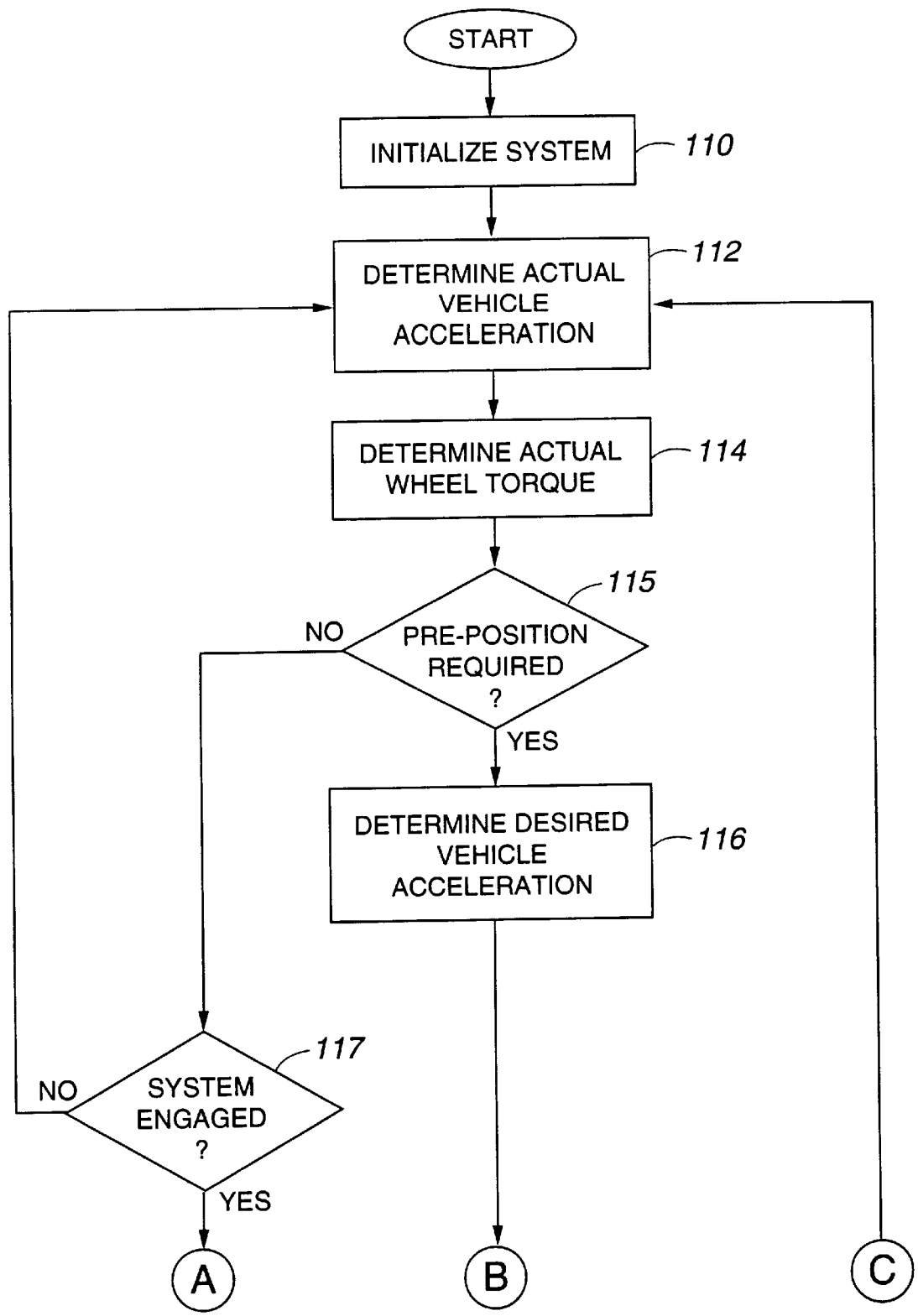
FIGS. 2a and 2b are flow chart illustrating control logic for implementing a system and method for vehicle speed control according to the present invention.
Figure 2B:
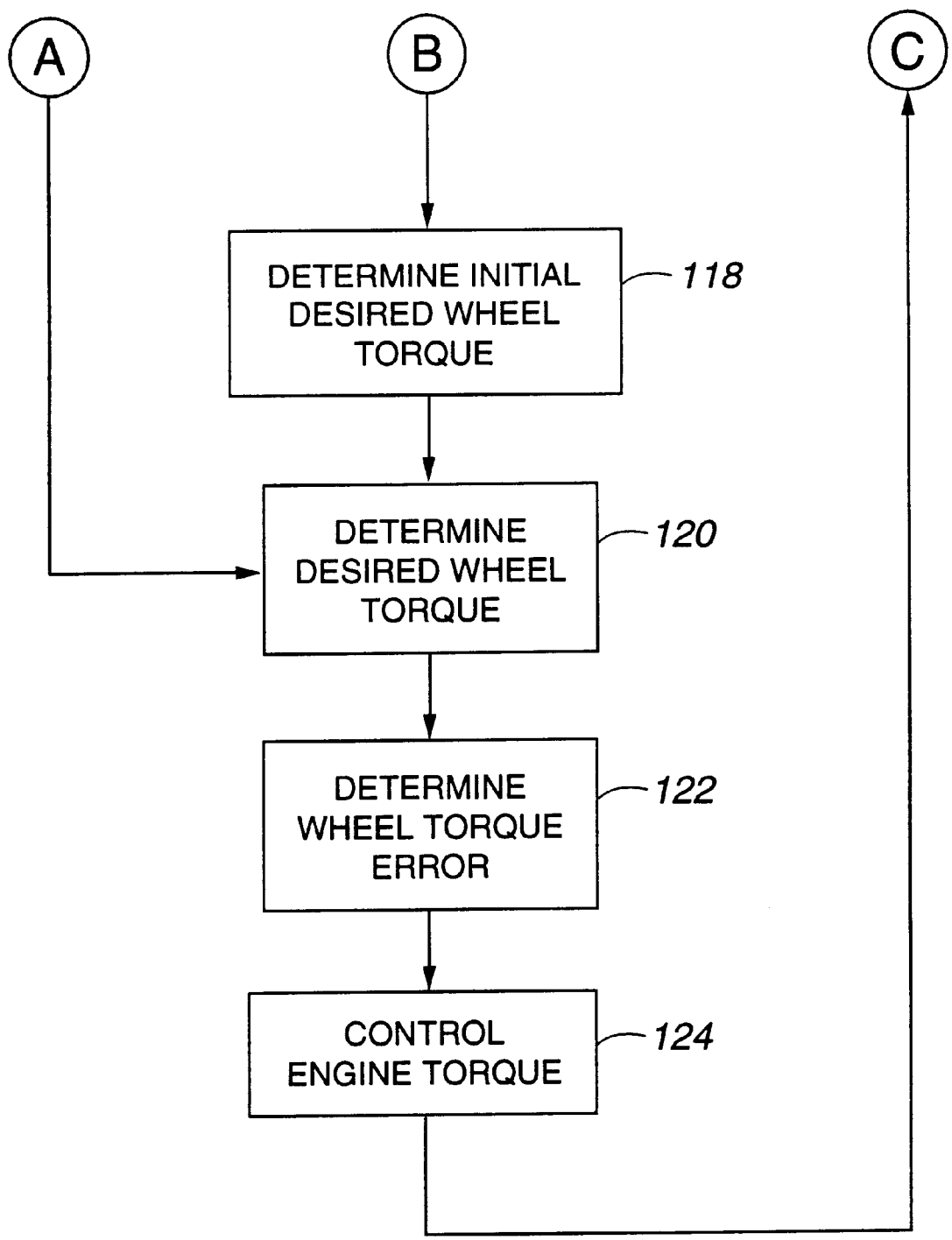
Figure 3:
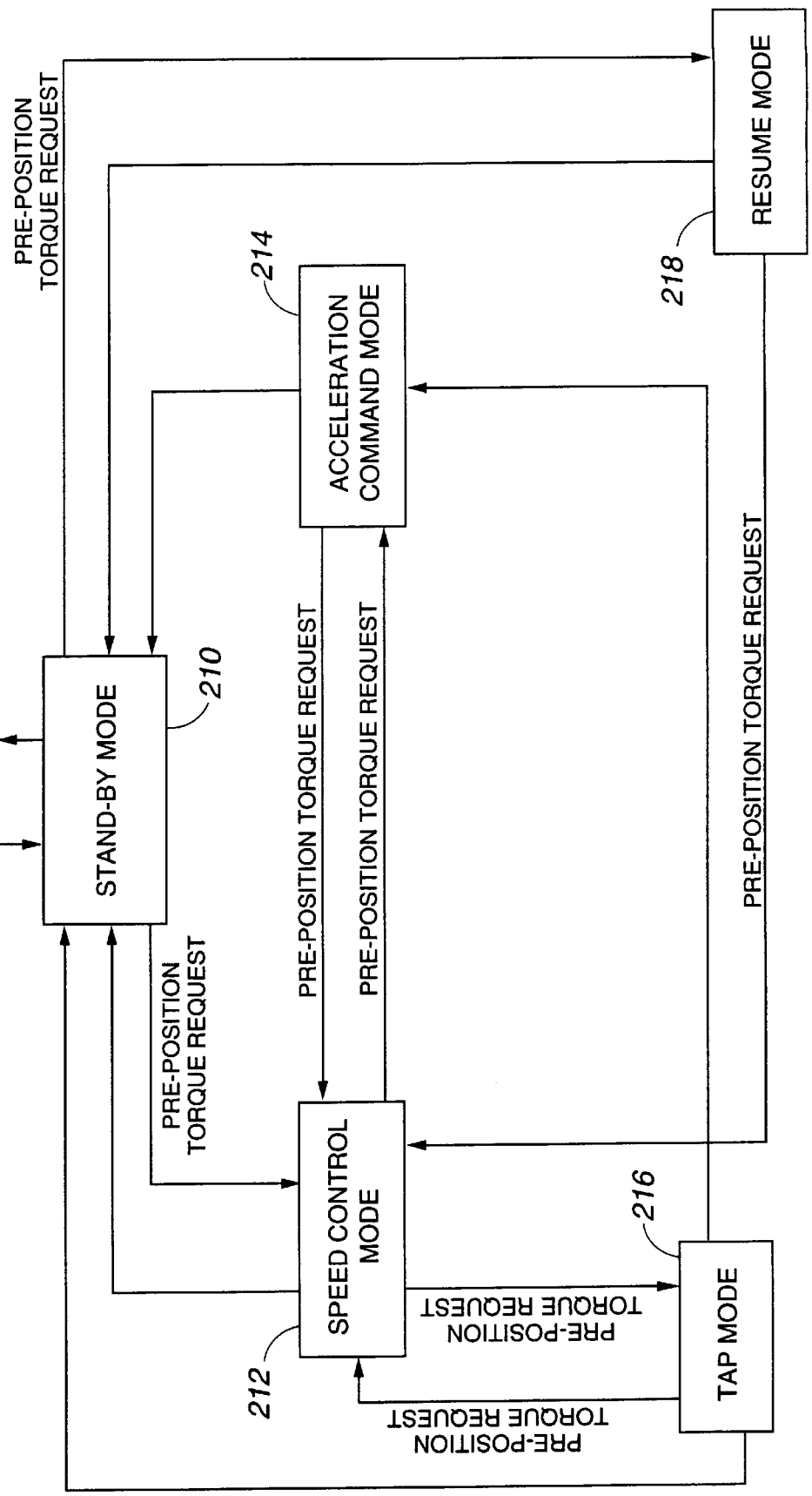
FIG. 3 is a state transition diagram of one embodiment of the present invention.

Turning now to FIG. 2, there is shown a flow diagram illustrating a method for controlling speed of a vehicle according to the initial wheel torque, TQinit, or the requested wheel torque, TQrqst, as described above. The flow chart of FIG. 2 is a simplified representation of one embodiment of the invention of which a more detailed representation is illustrated for the embodiment of FIG. 3. As one of ordinary skill in the art will appreciate, the various functions or operations shown in FIGS. 2 and 3 may be performed by software, hardware, or a combination of hardware and software. Furthermore, the particular order of operations and functions illustrated may not be necessary to accomplish the objects and advantages according to the present invention. In general, sequential operation is shown for ease of illustration only. As such, various processes and strategies may be used depending upon the particular application, including multi-tasking, interrupt (time) driven, event driven, or parallel computing strategies may be used to implement the illustrated control logic. Similarly, one of ordinary skill will in the art may recognize various equivalent implementations in hardware and/or software to accomplish the objects and advantages of the present invention. In a preferred embodiment of the present invention, the functions illustrated in FIGS. 2 and 3 are implemented primarily as software within a controller such as ECM 76.

Block 110 of FIG. 2 represents a variety of conditional checks which are performed during initialization of the system. That is, block 110 is executed only once per vehicle ignition key-on cycle. These preferably include both internal checks within the software, and external monitoring of various other powertrain components or features. If one or more conditions are not satisfied, the cruise control may be disabled and an appropriate indicator illuminated, such as the check engine light, or the like.

Provided the necessary conditions are satisfied by the initialization represented by block 110, the actual vehicle acceleration, Aact, is determined at block 112 either by direct measurement from a vehicle mounted sensor or by inference based on a calculated change in vehicle speed over time. Next, the actual wheel torque, TQact, is determined as represented by block 114. The actual wheel torque may be sensed or measured directly utilizing any known vehicle-mounted torque sensors. Alternatively, the actual wheel torque may be inferred based on current engine and transmission conditions. Blocks 112 and 114 are executed on a continuous basis whenever the vehicle ignition is on.

The method proceeds to determine if a change in operating made is being commanded that requires pre-positioning according to the present invention as represented at block 115. The various conditions/transitions requiring pre-positioning are further described in conjunction with FIG. 3.

FIG. 3 is a state transition diagram for one embodiment of the present invention. As should be appreciated by one of ordinary skill in the art, the number of states, the names of states, and allowed transitions between various states depend upon the particular application and may be implemented in a variety of equivalent manners. As such, the state transition diagram of FIG. 3 provides only one example used to describe the present invention. Preferably, execution of various system operating modes is facilitated through a state machine having states similar to those represented by blocks 200–218. The states or modes include an OFF mode 200, a standby mode 210, a speed control mode 212, an acceleration command mode 214, a tap mode 216, and a resume mode 218.

By definition, the state machine represented by the modes in FIG. 3 may exist in only one state (mode) at any time. Arrows indicate allowable state transitions which occur when applicable parameters are satisfied, as well as invocations of the torque pre-positioning function of the present invention. Note that the torque pre-positioning function is invoked only once per each transition. Thereafter, a closed loop control algorithm takes effect for as long as the system remains in any of the active modes. As will be appreciated by one of ordinary skill in the art, a state transition may result in modification of various status/control variables or parameters which are used to represent the state machine.

Before any mode other than OFF mode 200 may be executed, the system preferably performs a variety of conditional checks which include both internal and external checks to monitor other system components or software features. When the system is not in an active control mode, i.e. speed control mode 212 or acceleration command mode 214, the state machine can be either in OFF mode 200 or standby mode 210. In the OFF mode 200, all the global output registers are reset to default values. In the standby mode 210, the system is ready and awaits an activation command by the driver of the vehicle.

From the standby mode 210, the torque pre-positioning function is invoked when a transition is made to either the speed control mode 212 or the resume mode 218. The speed control mode 212 is entered when the driver sets the desired speed for the first time. The resume mode 218 is entered when the driver activates the resume switch and the system then executes a controlled return to a previously stored set speed.

From the speed control mode 212, the torque pre-positioning function is invoked when a transition is made to either the acceleration command mode 214 or the tap mode 216. The acceleration command mode 214 is entered when the driver issues a continuous acceleration or deceleration command. A continuous acceleration command may be indicated, for example, by depressing the set/accel switch for a predetermined calibratable period of time, such as 640 milliseconds. Similarly, a continuous deceleration command may be indicated by depressing the set/decel switch for some time period. It should be noted that acceleration command mode 214 may control either positive or negative acceleration, i.e. deceleration. Acceleration command mode 214 may also be activated when the driver depresses the resume switch. Once the speed error or acceleration error falls below a corresponding threshold, the speed control mode 212 is activated to maintain the desired or set speed.

Tap mode 216 is entered when either the set/accel switch or the set/coast switch is momentarily depressed so that the system may execute a set speed increment/decrement. When a sequence of "tap" commands are received, such as by repeatedly pressing and releasing either the set/accel switch or the set/coast switch, the state machine may execute either the speed control mode 212 or the acceleration command mode 214 depending on the new value of the set speed and the calibration of the operating bounds. When executing the speed control mode 212 from the tap mode 216, the torque pre-positioning function of the present invention is invoked.

While in either the acceleration command mode 214 or the resume mode 218, the torque pre-positioning function is invoked when a transition is made to the speed control mode 212.

Returning to FIG. 2, if pre-positioning is not required, the method proceeds to continuously monitor the actual vehicle acceleration and actual wheel torque if the speed control system is not engaged, as shown at block 117. If the speed control system is engaged, the method proceeds to operate in the conventional closed-loop fashion, as described in greater detail below. However, if pre-positioning is required, the desired vehicle acceleration, Ades, is determined based on the specific mode transition being commanded, as shown at block 116. For example, a value of 1 mph/sec may be selected when entering a mode requiring acceleration, a value of −1 mph/sec for a deceleration mode, and a value of 0 when entering the constant speed control mode 212 (FIG. 3).

Next, the initial desired wheel torque, TQinit, is determined according to Equation (10) shown above, as represented at block 118. The constant K is an acceleration compensation constant that is selected based on the specific mode transition being commanded, and TQerr is the most recent value of wheel torque error currently held in memory. K is theoretically a function of vehicle mass, wheel and tire rotational inertia and tire diameter, but can be calibrated empirically to tailor the feel of the system to provide optimal smoothness and response when executing a change in operating mode. Blocks 116 and 118 are executed only once whenever pre-positioning is required.

The system now transitions into a closed-loop control mode and generates a desired wheel torque, TQdes, as shown at block 120. The desired wheel torque is generated from the output of the PI or PID controller using set speed error as its input, as typically done.

At block 122, a wheel torque error, TQerr, is determined based on the difference between the actual wheel torque, TQact, and the desired wheel torque, TQdes. The resulting torque error is used in the calculation of the initial wheel torque the next time pre-positioning is required. The error may be filtered or averaged over time to produce a suitably stable and accurate value.

Finally the desired wheel torque, TQdes, is converted into a desired engine torque, and ultimately into a suitable engine control parameter for controlling the engine torque generated by the engine, as shown as block 124. Such parameters may include, but are not limited to, intake airflow by control of the throttle plate(s) or accelerator pedal and control of idle bypass airflow, ignition spark timing, and number of active fuel injectors. Blocks 120–124 are executed whenever the vehicle speed control system is active and engaged.

While the best mode for carrying out the invention has been described in detail, those familiar with the art to which this invention relates will recognize various alternative designs and embodiments for practicing the invention as defined by the following claims.

What is claimed is:

1. For use with a vehicle having a torque-based speed control system which controls an internal combustion engine to control the speed of the vehicle, a method for controlling the internal combustion engine for a plurality of operating modes including an initial entry into speed control mode and a plurality of transitional dynamic operating modes, the method comprising:

determining an actual vehicle acceleration;

determining an actual wheel torque;

determining an initial desired wheel torque based on the actual vehicle acceleration and the actual wheel torque; and controlling torque generated by the engine based on the initial desired wheel torque so as to smoothly control the speed of the vehicle upon said initial entry into speed control mode and upon transitions between said dynamic operating modes.

2. The method as recited in claim 1 wherein said step of determining the initial desired wheel torque further comprises determining a desired vehicle acceleration based on one of the plurality of operating modes.

3. The method as recited in claim 2 wherein said step of determining the initial desired wheel torque further comprises determining a wheel torque error based on the actual wheel torque.

4. The method as recited in claim 3 wherein said step of determining the initial desired wheel torque comprises determining the initial desired wheel torque according to the following:

$$TQinit=TQact-K(Aact-Ades)-TQerr,$$

where TQinit corresponds to the initial desired wheel torque, TQact corresponds to the actual wheel torque, Aact corresponds to the actual vehicle acceleration, Ades corresponds to the desired vehicle acceleration, TQerr corresponds to the wheel torque error, and K is a predetermined acceleration compensation constant.

5. The method as recited in claim 4 wherein the vehicle has a mass and wherein the acceleration compensation constant is based on the mass of the vehicle.

6. The method as recited in claim 1 wherein said step of controlling torque generated by the engine comprises controlling airflow to the engine.

7. The method as recited in claim 1 wherein said step of controlling torque generated by the engine comprises controlling quantity of fuel delivered to the engine.

8. The method as recited in claim 1 wherein said step of controlling torque generated by the engine comprises controlling spark timing .

9. For use with a vehicle having a torque-based speed control system which controls an internal combustion engine to control the speed of the vehicle, a computer readable storage medium having stored therein instructions executable by a computer to control the internal combustion engine for a plurality of operating modes including an initial entry into speed control mode and a plurality of transitional dynamic operating modes, the medium comprising:

instructions for determining an actual vehicle acceleration;

instructions for determining an actual wheel torque;

instructions for determining an initial desired wheel torque based on the actual vehicle acceleration and the actual wheel torque; and instructions for controlling torque generated by the engine based on the initial desired wheel torque so as to smoothly control the speed of the vehicle upon said initial entry into speed control mode and upon transitions between said dynamic operating modes.

10. The medium of claim 9 wherein the instructions for determining the initial desired wheel torque further comprises instructions for determining a desired vehicle acceleration based on one of the plurality of operating modes.

11. The medium of claim 10 wherein the instructions for determining the initial desired wheel torque further comprise instructions for determining a wheel torque error based on the actual wheel torque.

12. The medium of claim 11 wherein the instructions for determining the initial desired wheel torque comprises instructions for determining the initial desired wheel torque according to the following:

$$TQinit=TQact-K(Aact-Ades)-TQerr,$$

where TQinit corresponds to the initial desired wheel torque, TQact corresponds to the actual wheel torque, Aact corresponds to the actual vehicle acceleration, Ades corresponds to the desired vehicle acceleration, TQerr corresponds to the wheel torque error, and K is a predetermined acceleration compensation constant.

13. For use with a vehicle having a torque-based speed control system which controls an internal combustion engine to control the speed of the vehicle, a system for controlling the internal combustion engine for a plurality of operating modes including an initial entry into speed control mode and a plurality of transitional dynamic operating modes, the system comprising:

means for determining an actual vehicle acceleration;

means for determining an actual wheel torque; and a controller operative to determine an initial desired wheel torque based on the actual vehicle acceleration and the actual wheel torque, and control torque generated by the engine based on the initial desired wheel torque so as to smoothly control the speed of the vehicle upon said initial entry into speed control mode and upon transitions between said dynamic operating modes.

14. The system as recited in claim 13 wherein the controller, in determining the initial desired wheel torque, is further operative to determine a desired vehicle acceleration based on one of the plurality of operating modes.

15. The system as recited in claim 14 wherein the controller, in determining the initial desired wheel torque, is further operative to determine a wheel torque error based on the actual wheel torque.

16. The system as recited in claim 15 wherein the controller, in determining the initial desired wheel torque, is operative to determine the initial desired wheel torque according to the following:

$$TQinit=TQact-K(Aact-Ades)-TQerr,$$

where TQinit corresponds to the initial desired wheel torque, TQact corresponds to the actual wheel torque, Aact corresponds to the actual vehicle acceleration, Ades corresponds to the desired vehicle acceleration, TQerr corresponds to the wheel torque error, and K is a predetermined acceleration compensation constant.

17. The system as recited in claim 16 wherein the vehicle has a mass and wherein the acceleration compensation constant is based on the mass of the vehicle.

18. The system as recited in claim 13 wherein the controller, in controlling torque generated by the engine, is operative to control airflow to the engine.

19. The system as recited in claim 13 wherein the controller, in controlling torque generated by the engine, is operative to control quantity of fuel delivered to the engine.

20. The system as recited in claim 13 wherein the controller, in controlling torque generated by the engine, is operative to control spark timing.

* * * * *